(12) United States Patent
Joh (10) Patent No.: US 8,255,704 B1
(45) Date of Patent: Aug. 28, 2012

(54) POOL ENCRYPTION WITH AUTOMATIC DETECTION

(75) Inventor: Jennifer Joh, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 1076 days.

(21) Appl. No.: 11/467,103

(22) Filed: Aug. 24, 2006

(51) Int. Cl.
*G06F 7/00* (2006.01)

(52) U.S. Cl. ........................................ 713/193; 713/150

(58) Field of Classification Search .................. None
See application file for complete search history.

(56) References Cited

U.S. PATENT DOCUMENTS

| | | | |
|---|---|---|---|
| 6,684,222 B1 | 1/2004 | Cornelius et al. | |
| 7,107,298 B2 | 9/2006 | Prahlad et al. | |
| 7,174,433 B2 | 2/2007 | Kottomtharayil et al. | |
| 7,401,194 B2* | 7/2008 | Jewell | 711/162 |
| 7,437,572 B2* | 10/2008 | Gammel et al. | 713/193 |
| 7,584,227 B2 | 9/2009 | Gokhale et al. | |
| 7,809,914 B2 | 10/2010 | Kottomtharayil et al. | |
| 2001/0054155 A1 | 12/2001 | Hagan et al. | |
| 2004/0153642 A1 | 8/2004 | Plotkin et al. | |
| 2005/0257062 A1* | 11/2005 | Ignatius et al. | 713/176 |
| 2006/0005048 A1* | 1/2006 | Osaki et al. | 713/193 |
| 2006/0126850 A1* | 6/2006 | Dawson et al. | 380/284 |
| 2007/0057048 A1 | 3/2007 | Plotkin et al. | |
| 2007/0058801 A1 | 3/2007 | Plotkin et al. | |
| 2007/0083759 A1* | 4/2007 | Drew et al. | 713/168 |
| 2007/0174634 A1 | 7/2007 | Plotkin et al. | |
| 2008/0159542 A1* | 7/2008 | Ito et al. | 380/279 |

FOREIGN PATENT DOCUMENTS

| | | | |
|---|---|---|---|
| WO | WO 00/52875 A1 | 9/2000 | |
| WO | WO 02/093314 A2 | 11/2002 | |

OTHER PUBLICATIONS

Christian Geuer-Pollmann, XML Pool Encryption, 2002, ACM, Session 1: encryption, 1-9.*
Computer Services, File Organization and Maintenance, 2001, Computer Services Southeast Missouri State University, Computer Technology Courses, p. 1-3.*
Decru, Inc. "Decru Datafort™ Storage Security Appliances," © 2004, 2 pages.
Decru, Inc. "Decru Datafort™ E-Series Storage Security Appliances—Transparent Data Security for Network Attached Storage (NAS)," © 2004, 2 pages.
Decru, Inc. "Decru Datafort™ FC-Series Storage Security Appliances—Comprehensive Security for Storage Area Networks and Tape Backup," © 2004, 2 pages.

\* cited by examiner

*Primary Examiner* — Jeffrey Pwu
*Assistant Examiner* — Nega Woldemariam
(74) *Attorney, Agent, or Firm* — Cesari and McKenna, LLP (57) ABSTRACT

The invention provides a mechanism for selectively encrypting media within a consolidation of storage devices into a shared configuration, i.e. a media pool. The invention also provides a mechanism by which more than one key can be used for encrypting media. The invention accomplishes tape encryption by media parsing. An encryption key is determined based on the backup application's grouping of data sets. This is accomplished by examining the volume header of the tape and, from the header, deciding if pools are supported by the application. If they are, the invention auto-creates a pool key. In the case where the pools are known in advance, a user with appropriate administrative privileges can create the pools and assign keys to them. The invention thus allows mirroring of the logical groupings in the backup application with encryption keys.

22 Claims, 5 Drawing Sheets

POOL ENCRYPTION WITH AUTOMATIC DETECTION

BACKGROUND OF THE INVENTION

1. Technical Field

The invention relates to data backup applications that involve the grouping of criteria and attributes for the encryption of media. More particularly, the invention relates to tape backup of data using pool encryption with automatic detection.

2. Description of the Prior Art

As organizations seek to manage and store burgeoning volumes of data, storage networks continue to increase in size and complexity. IT teams are tasked with the growing challenge of ensuring this mass of data is available. They must backup data, restore data as needed, and ensure that data is protected in the event of a disaster. Today's backup technologies go a long way toward addressing these requirements. However, they do not take into account the security and privacy of the data itself.

By nature, backup procedures introduce additional threats to stored data. For example, with each additional distributed copy of cleartext data, organizations increase the risk of unauthorized access. Most disaster recovery plans place data offsite in a remote or outsourced facility, most likely with less stringent security. Further, information density continues to increase. When hundreds of gigabytes of data are easily stored on a single backup tape, the stakes go up significantly if that tape goes missing.

Storage security appliances, such as the Decru DataFort™, which is a computer system manufactured by Decru (Redwood City, Calif.), provide a solution that simplifies data security in these scenarios. The storage security appliance also includes an operating system, or other similar software, that performs the functions of the storage security appliance, such as encryption. By encrypting data before they are ever written to disk or tape, storage security appliances ensure that only authorized people are able to read data, and fully protect data against unauthorized access if a disk or tape is lost or stolen.

It is known to perform encrypting on a per-host basis. However, this only makes sense if all the hosts that are part of a media-server group reference the same key or set of keys for encrypting media because each of the servers in the group must be able to read and append to the same set of tapes. If the goal is to hide data from a different media server group, then different keys could be granted to the second media group, such that permissions to the first group's keys would not be granted to the second group. Selectively sharing tapes between two media-server groups becomes difficult with this method because to create a set of media which uses a shared key, yet retain the ability to create data encrypted with a private key, one would have to rotate a host key manually from a private key to a shared key, and back to the private key.

In such a storage environment, it is advantageous to group resources for the benefit of group members. This makes the most efficient use of such resources. It is thus known to consolidate storage devices into a shared configuration which is referred to as a pool. For example, a tape pool comprises a collection of available storage devices of the same media type, i.e. tape storage devices, that are consolidated to provide a shared resource to two or more users. Thus, in pool encryption, a set of shared tapes is created by assigning media to a pool which is designated to be shared with a second media server group, with no changes necessary on the encryption device. While a single key is convenient to manage such a pool across a large deployment, if this key is compromised, then all of the data in the pool is vulnerable. Again, in this approach, manual key rotation may be used to share a selected data set with another location.

A further aspect of such storage security appliance concerns logically grouping the criteria and attributes to be used for encrypting media according to the backup application grouping of media. Backup applications, such as Veritas NetBackup, allow the grouping of media into media pools. It can also be convenient to keep these pools of media cryptographically separated. For example, if one tape pool is destined to be shipped offsite versus being kept onsite, then it would be useful to encrypt such offsite tapes because these tapes are more vulnerable by virtue of their being offsite. By way of further example, if tapes from a customer pool are to be sent to many different customers, it would be useful to encrypt these tapes using a unique key per tape to keep each customer's data private.

It would therefore be advantageous to provide a mechanism for selectively encrypting media within a media pool.

It would also be advantageous to provide a mechanism by which more than one key can be used for encrypting such media.

SUMMARY OF THE INVENTION

The invention provides a mechanism for selectively encrypting media, such as tapes, within a shared configuration comprising two or more consolidated storage devices, referred to herein as a media pool. For purposes of the discussion herein, selecting encryption refers to the ability of system user's to apply encryption to storage media or portions of storage media as desired, e.g. to maintain unique encryption in a heterogeneous storage environment. The invention also provides a mechanism by which more than one key can be used for encrypting the media in such pool. The invention accomplishes this encryption, for example for tape storage, by media parsing. In media parsing, an encryption key is determined based on a backup application's grouping of data sets. This is accomplished by looking at the volume header of a tape and, from the header, deciding if pools are supported by the application. If they are, then the invention provides a mechanism that auto-creates a pool key. In the case where the pools are known in advance, a user can create the pools and assign keys to them. The invention thus provides a technique that allows mirroring of the logical groupings in the backup application with encryption keys. If the header is not known, then an automatic detection scheme is applied that uses data received by the storage security appliance to identify the volume header as to its source's backup application.

DETAILED DESCRIPTION OF THE INVENTION

Storage Security Appliances

Figure 1:
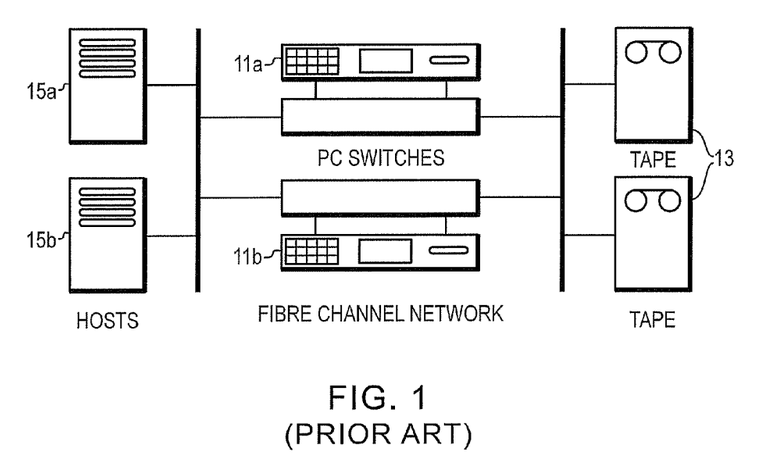
FIG. 1 is a prior art block schematic diagram that illustrates two-port storage security appliances clustered in the network fabric to support multiple tape libraries.

FIG. 1 is a block schematic diagram that illustrates a two-port storage security appliances clustered in the network fabric to support multiple tape libraries. Storage security appliances are also available with any other number of ports, e.g. ten ports, supporting 10 Gbps or more of throughput. By encrypting data and routing all access through secure hardware, the storage security appliance 11a, 11b allows organizations to control and track data access between storage media 13 and attached hosts 15a, 15b. Encryption effectively blocks all back doors to the data, thus protecting sensitive information on disk or tape against theft or misuse. Even if an unauthorized person gains access to the media, they only see meaningless characters.

The invention operates within an exemplary architecture, such as is shown in FIG. 1. One example of such device is the Decru DataFort™ storage security appliance, or device, manufactured by Decru (Redwood City, Calif.).

Figure 2:
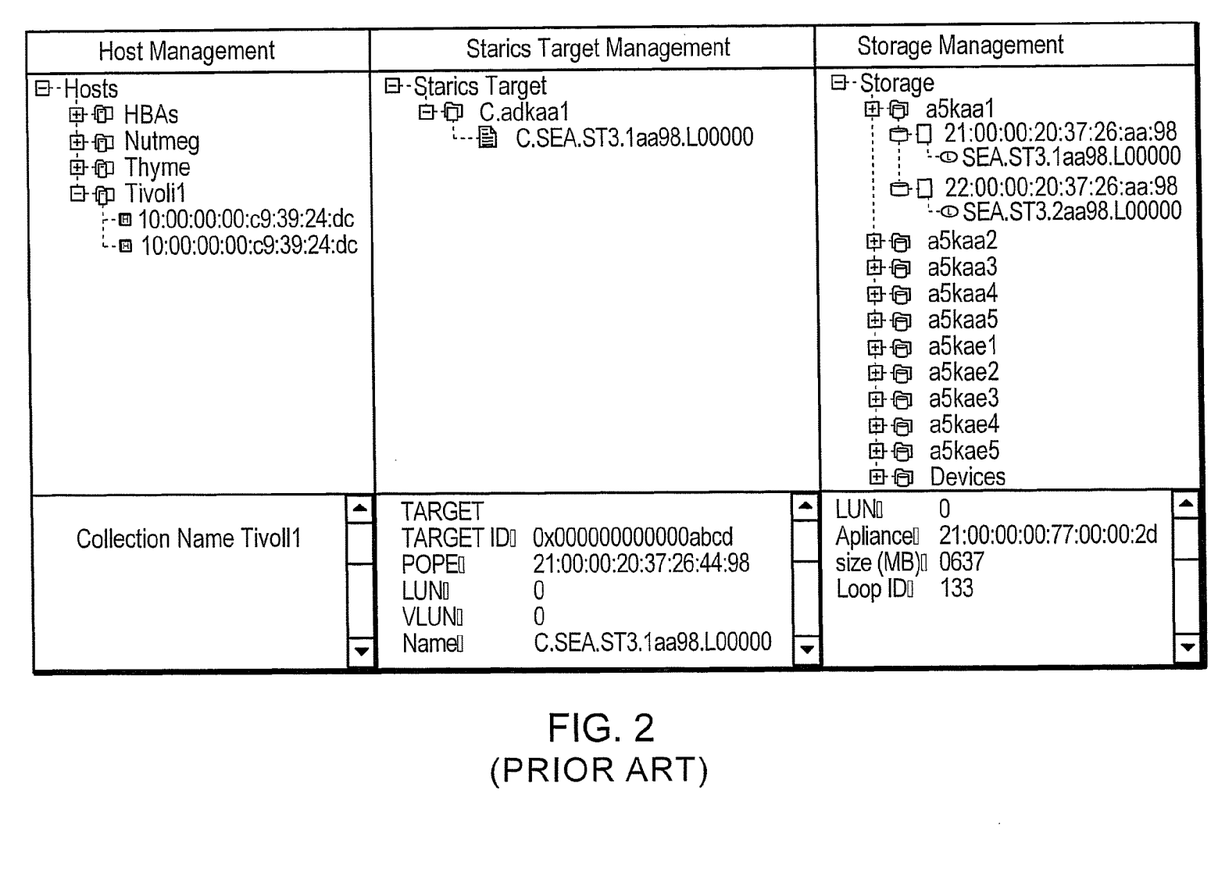
FIG. 2 is a prior art screen shot of a Web-based interface that provides centralized management and administration of a storage network across an enterprise.

When installed between hosts and storage, the storage security appliance encrypts data en route to storage devices and decrypts data as they are read from storage by hosts, without impact on the existing network structure. Further, two or more storage security appliances in a clustered configuration on a single network can provide automatic failover protection with all encryption key and access control information shared securely between the cluster members. The storage security appliance administrator has direct access to essential network setup and maintenance tasks by means of the web-based management interface (see FIG. 2). All key security administration tasks, including those needed to manage all members of a storage security appliance cluster can be accessed using this tool from a single workstation.

For purposes of the discussion herein, a storage security appliance enables security for stored data on tape by providing hardware-based compression, data encryption, and crypto-signed logging. Such storage security appliance is managed from a centralized, secure interface. An automated key management system ensures that data are both available and secure.

Such a storage security appliance comprises a storage encryption processor, i.e. a hardware engine that provides full-duplex, wire-speed encryption and key management. Such a storage security appliance also incorporates encryption, such as AES-256 encryption, to protect stored data. Such an appliance can also use a random number generator to create keys, and cleartext keys never leave the appliance's secure hardware. Thus, each storage security appliance can encrypt and decrypt at multi-gigabit speeds, making it possible to support multiple tape libraries with one storage security appliance or storage security appliance cluster.

Preferred Embodiment of the Invention

The invention allows the consolidation of storage devices into a shared configuration or grouping, e.g. pooling of encrypted tapes, to match backup application pools. That is, one embodiment of the invention allows shared storage devices which are within a storage security appliance cluster, i.e. the pool, to be managed via a backup application, such that files, folders, and volumes on the storage devices are encrypted and logically organized consistent with encryption and organization provided in the backup application. Thus, the storage devices logically mirror the backup application. Previously, encryption was based on any other parameters, such as the host identifier (or host world-wide name), a global key, the tape drive, or a user-defined key that the user maps to a media label. Pool-based encryption has advantages over all these methods because, for example, media within a pool may be selectively encrypted, and more than one key may be used to encrypt such media.

Figure 3:
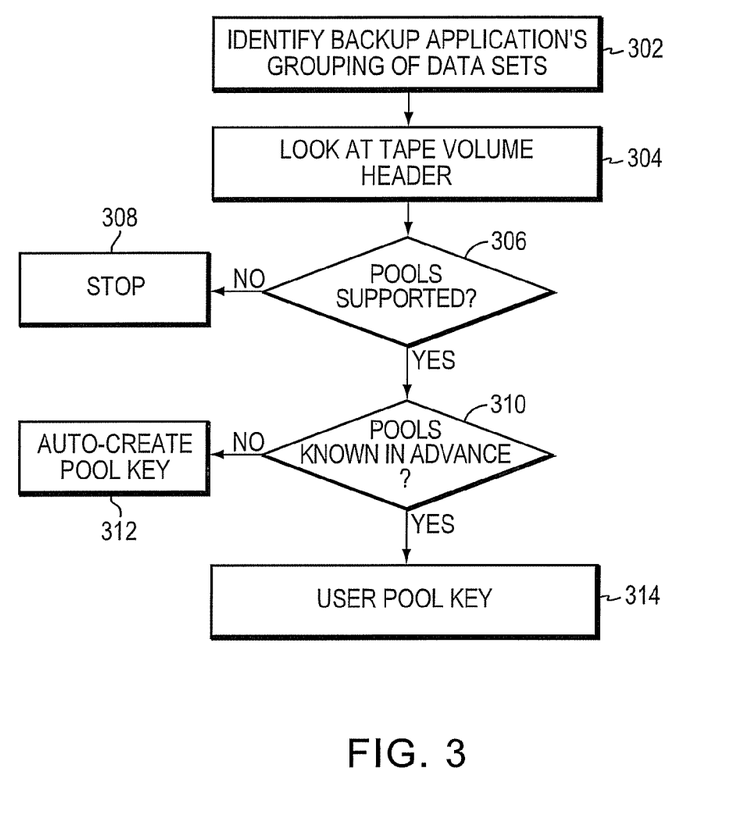
FIG. 3 is a flow diagram showing pool key determination according to the invention.

FIG. 3 is a flow diagram showing pool key determination according to the invention. An exemplary aspect of the invention provides tape encryption by media parsing. An encryption key is determined based on the backup application's grouping of data sets (302). This is accomplished by examining, or looking at the volume header of the tape (304) and, from the header, deciding if pools are supported by the application (306). For example, the header can include information such as the source backup application, which is information that permits the operating system of the storage security appliance to make the decision. Further detail regarding the volume header is described below. If they are not, then no action is taken (308). If they are (310), the invention either auto-creates a pool key (312) or in the case where the pools are known in advance (314), a user can create the pools and assign keys to them. The invention, thus allows mirroring in a tape pool of the logical groupings in the backup application with encryption keys.

Figure 4:
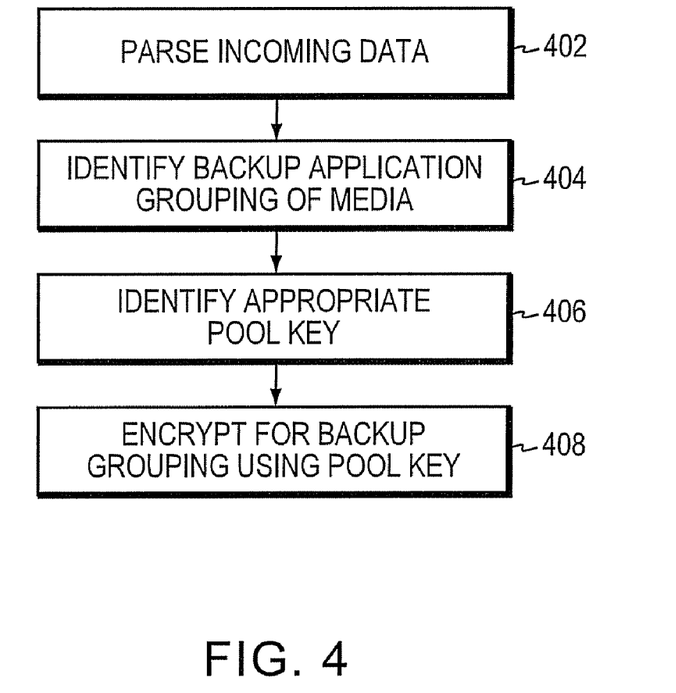
FIG. 4 is a flow diagram showing pool key identification according to the invention.

FIG. 4 is a flow diagram showing pool key identification according to the invention. The presently preferred embodiment of the invention operates in connection with a tape backup device, such as a physical tape backup device or a virtual tape backup device (also referred to as a virtual tape library), although those skilled in the art will appreciate that the invention is applicable to other storage facilities. The storage security appliance is connected to a media server on the host end and to a tape library on the storage end. By parsing incoming data at the storage security appliance (402), the invention makes it possible to gain information about the backup application and how it is grouping its media (404). Based on that, the storage security appliance can identify appropriate keys (406) and encrypt and mirror the backup application groupings using one encryption key per pool (408). For example, if there are ten different pools, the system can use one of ten different keys per pool. Thus, one group of media is secure from the others because each group uses a different key.

In one embodiment, each pool has a key which is different from the key of each of the other pools. For example, for the backup of data a user, system administrator, user with appropriate administrator privileges, or the like can define backup policies that determine which pool to use for particular media, and that media gets assigned to that pool. In the case of off-site shipment of tapes there is an off-site pool that can have different keys. If the tape goes out or the key is compromised, for example because the tape goes out to a customer or another site, such as a recovery site, and the key is compromised, then it is not necessary to worry about all the other tapes from the other pools because the keys for these other tapes are different.

The invention thus provides a way of logically assigning the keys appropriately to the pools. This assignment can take any desired form. For example, keys may be assigned to pools of off-site versus on-site tapes, they may be assigned on a customer basis, on a volume, folder, or file basis, on a matter basis, or any other desired scheme. Further, multiple keys may be assigned to pools, where some keys expire before others, some keys have greater privileges than others, and the like. Additionally, some keys may be limited to fewer pools, e.g. a single pool, while other keys may have access to many pools. Some pools may require more than one key.

The invention also provides an automatic detection scheme that examines and parses the data as they are received by the storage security appliance. In this way, the system gains knowledge of the volume header that the backup application uses. Based on the information examined and parsed, the system tries to identify the volume header as to its source backup application. Once the header is identified the system looks within the header to determine, for example, which pool the tape is associated with, if pools are supported, or the media ID of the tape. For example, an administrator could access the storage security appliance and determine how these assignments are made and how the backup application is configured. In another embodiment, though, the system is set up to auto-detect and the user does not have to know to which pools the data are going. In this embodiment, the system automatically creates the pool and gives the pool a unique key if the system default provides instructions to perform that action.

The system can apply certain rules to determine how to assign the key such as, for example, whether auto-detected pools are encrypted or whether encryption is applied per tape or per pool. Thus, this embodiment of the invention assigns a key to a volume that becomes part of a pool. For example, suppose a customer uses one key per tape such that their pool is defined as a per-tape pool, i.e. each tape is a separate pool. When the system auto-detects that pool, it assigns a unique key per tape for any tape that goes into that pool. In this way, it is possible to set expiration dates on the keys so the keys can expire, or so that the keys can be read-only for a period of time, after which the key is read/writeable, and after which the key can be deleted so it cannot be read. Thus, an archive of tapes can be deleted on a tape by tape basis.

Figure 5:
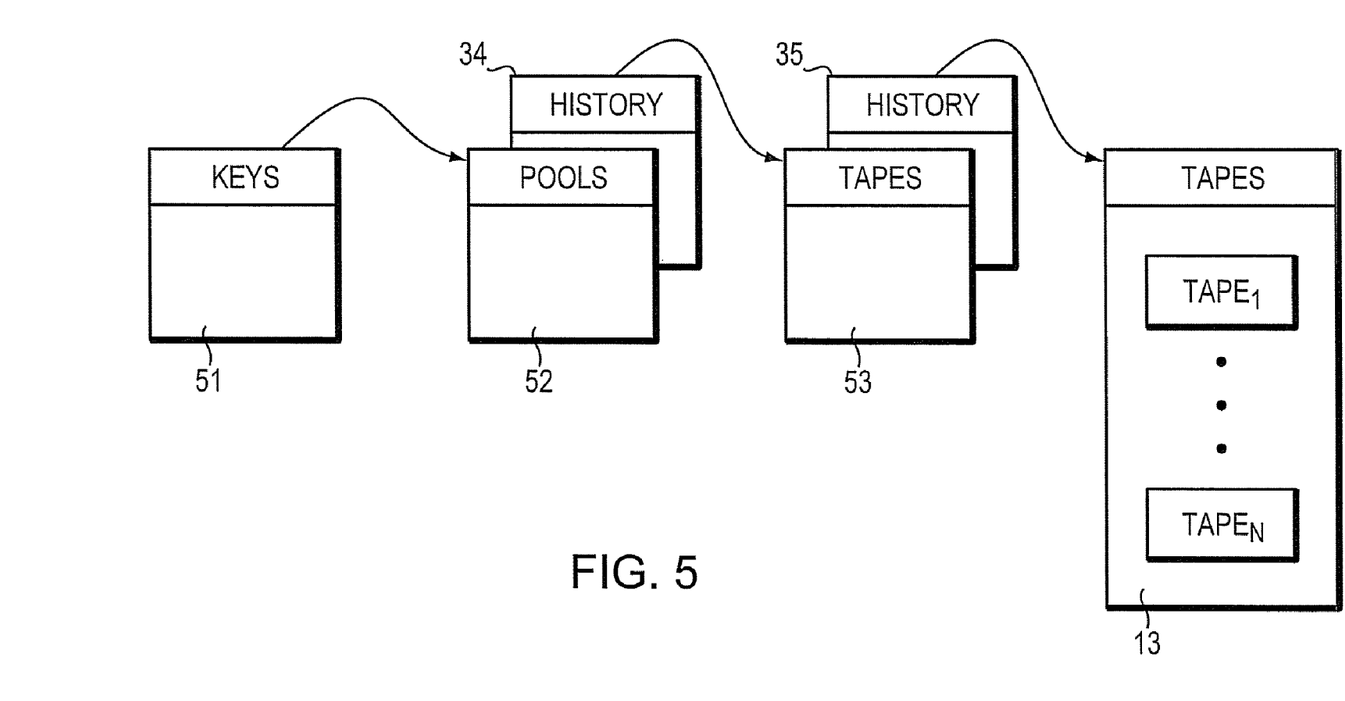
FIG. 5 is a block schematic diagram showing a key table, a pool table, a tape table, a pool history, and a tape history according to the invention.

Such key assignment is tracked in a key table, for example. Thus, the system maintains appropriate tables to keep track of such key assignment. FIG. 5 is a block schematic diagram showing a key table 51, a pool table 52, a tape table 53, and a pool history 54 and a tape history 55. In an exemplary embodiment of the invention, the operating system of the storage security appliance keeps track of the pool label in the event that a change is made to a key in the table. If such a change occurs, then there is still an entry in the history from which a user can restore using that key, even though it is not the current key.

Tape Pool Features

The presently preferred embodiment of the invention supports pool keys in place of host keys. Pools can have the following access control list (ACL) states: clear, learning, and set. Further, learning mode can be enabled to track pool access. Learning mode can be set by an administrator and allows open access to media created in a pool which has not been initialized with ACLS. For example, if the pool is in the clear state when learning mode is turned on, then any accesses to the pool are recorded and an ACL is automatically assigned to the accessing host. If the pool is in the set state, then no new ACLS are assigned during learning mode. Upon exiting from learning mode, any pool in which an ACL was recorded is placed in the set state. Any pool that used to be in the clear state and had no ACLS recorded is placed back in the clear state. At any time, if an ACL is set manually, then the pool ACL state changes to the set state.

An exemplary embodiment of the present invention may also include a default policy. For example, a new pool may be assigned a default policy which maps to a pool. Most pools are created automatically as the storage security appliance discovers them by parsing tape data as they are written or read by the tape backup application. An auto-discovered pool takes on the system default policy. This setting also applies to secured storage target keys. When creating a pool or secured storage target, if the user wants the key to be exportable anytime in the future, then it is necessary to specify that it is exportable. For example, because pools may be created automatically, or perhaps from the graphical user interface (GUI), it is convenient to provide a system default export policy (which is off by default). Exportable keys are encrypted by a separate master key. Keys are exported using a oneway trust mechanism. This process defines whether a pool is initially cleartext or encrypted if it is automatically discovered or created at the GUI without any special flags. By default, a pool is created in an encrypted form.

Pool ACLs

ACLs are compressed between pools and hosts to tie the removable media data to the host rather than to the device.

Auto-detected pools are found during the backup process as data from the tape are parsed for media and pool labels. The media and pool information is passed from kernel to management and stored in a database, e.g. a relational database, flat file database, hierarchical database, or the like. One exemplary assumption is that the application specific format is known beforehand for the tapes and that the application supports pools. Auto-detected pool labels, as seen in the GUI, and as written in tape metadata, match the application pool label.

User-defined pools are explicitly entered into the GUI by the user, or user with administrative privileges, or the like, before media belonging to the pool is created. This type of pool can match the backup application or override it. Matching implies that the pool already exists in the application and the usual auto-detection finds media that match the pool. As in the case of auto-detected pools, the pool label stored in the database matches the applications pool label as written in the tapes data, as well as the pool label written to the metadata.

Overriding can be used when a media ID which normally belongs to an auto-detected pool is assigned to a different pool for encryption purposes. This is also useful if the auto-detection of media/pool information for a particular application, such as Tivoli, is not supported. In the case of a user-defined pool that overrides an auto-detected pool or host-default pool, the pool label as stored in the database and stored in tape metadata does not correlate with the actual data the application writes to the tapes.

Host default pools are used when a storage security appliance cannot parse pool information from the tape data. If the media ID is detected, then it is recorded in the tape history along with the host default pool label. The host default pool has a name and is associated with the host in question by a reference in the host database table. This reference can be changed to point to a different pool or a user-defined pool by using the GUI.

In an exemplary embodiment of the present invention, the previously described tape volume header information can include a Media Identifier (ID). The Media ID is used for key management to retrieve a specific key (for one-way trust or key management) for a tape that was encrypted on a per-tape policy. The tape tables are used on reads from tape. The key ID is obtained from metadata and the key information is retrieved from a relation between the tape key history and they key secured storage target.

Further Information Includes a Pool Identifier (ID).

The pool ID is written to tape metadata. For example, this value could match a value that is a database, but that is not necessarily an application pool label, e.g. when the application does not support pools.

Pool keys are stored in many tables in the database and the corresponding key IDs can be written to tape metadata. When requesting a new tape key for write operations, the assumption is that a host writes to the tape to re-label an old tape or initialize a new tape. When this event occurs, the storage security appliance parses the data written to the tape to obtain media and pool information and uses the pool information to generate a new key based on the pool policy assigned to that pool or to use an existing key, if appropriate. The key information is stored in the tape as metadata, except in the case of cleartext where no metadata is written. The pool label is also stored in metadata so that the proper ACL can be applied to the media when it is read or appended.

When requesting permission to perform a read operation, the assumption is that the host reads the tapes to identify a tape before it reads from or writes to any other part of the tape.

Further, when reading encrypted data, valid metadata is found. From this information, the key ID and the pool label can be obtained (as written in metadata, as opposed to the pool label written in tape data).

Further, when reading cleartext, if the tape is read and no metadata are found, then it can be assumed that it is cleartext. Then the next step may be to parse tape data to obtain the media label and pool label from the tape. This uses the same parse function as a write to the tape operation. Further, the process uses a similar mechanism to send or transmit the media label and pool label when the following is determined:

Was a pool discovered? If not, then determine permissions.
Does the host have permission to access this pool? If learning is on, then grant access if applicable to this pool.
If access is allowed, then check if this pool is encrypted or cleartext. If encrypted, then do not deny access, but copy over the encrypted key.
Later if an append is attempted, then deny access if the current pool is set to encrypt. This is to avoid tricking the host into writing cleartext merely by placing a cleartext tape into the system and attempting an append operation, when the current intention for this pool information was to encrypt data. If the pool was once cleartext or there were legacy tapes before the storage security appliance was introduced, then this could be a problem. In this case, users can read but cannot write to the tapes. If desired, users can slowly expire these tapes or they may re-use as encrypted backups.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method performed by a storage security appliance for securing one or more backup data sets, comprising:
    receiving a first backup data set of the one or more backup data sets;
    grouping, logically, the first backup data set into a first pool within the storage security appliance;
    examining information of the first backup data set to determine whether the first backup data set is also logically grouped into a second pool;
    in response to determining that the first backup data set is also logically grouped into the second pool, associating the first pool with the second pool, determining an encryption key assigned to the first pool, encrypting data of the first backup data set with the encryption key; and
    storing persistently the encrypted first backup data set on a set of media, wherein the information of the first backup data set identifies the second pool.

2. The method of claim 1 further comprising:
    parsing the first backup data set to determine an identifier of a logical grouping of the set of media associated with the first backup data set, wherein the logical grouping of the set of media includes a media pool;
    retrieving an encryption key based on the identifier of the logical grouping of the set of media, wherein the first backup data set is encrypted using the encryption key; and
    storing persistently the encrypted first backup data set on the media pool.

3. The method of claim 2, further comprising using more than one encryption key to encrypt the data.

4. The method of claim 2, further comprising:
    using a backup policy to assign a medium of the set of media to the media pool.

5. The method of claim 2, further comprising using the encryption key for an off-site shipment of a first portion of the set of media and using a second encryption key for a remaining portion of the set of media that are not shipped off-site.

6. The method of claim 2, further comprising assigning the encryption key to the media pool based at least in part on at least one of a customer basis, a volume basis, a folder basis, and a matter basis.

7. The method of claim 2, further comprising assigning the encryption key to the media pool if the logical organization of the media pool is known in advance.

8. The method of claim 7, further comprising tracking assignment of the encryption key using a key table.

9. The method of claim 2, further comprising supporting pool keys in place of host keys.

10. The method of claim 2, further comprising setting an expiration date on the encryption key.

11. The method of claim 1, wherein the information comprises a volume header of a medium of the set of media.

12. The method of claim 2, further comprising performing automatic pool detection by examining and parsing incoming data to identify a volume header of the first backup data set organized by a backup application.

13. The method of claim 2, further comprising:
    creating the media pool automatically; and
    assigning the media pool a unique encryption key.

14. The method of claim 2, further comprising:
    examining a volume header of the medium to determine if the media pool is supported by a backup application.

15. The method of claim 2, wherein the medium comprises at least one tape storage device.

16. A system configured to encrypt data, comprising:
    a network port configured to receive a backup data set;
    a processor configured to execute an operating system, the operating system configured to group, logically, the backup data set into a first pool;
    examine information of the backup data set to determine whether the backup data set is logically also grouped into a second pool, in response to determining that the backup data set is also logically grouped into the second pool, associate the first pool with the second pool, determine an encryption key assigned to the first pool, encrypt data of the backup data set with the encryption key; and
    store persistently the encrypted backup data set on a set of media, wherein the information of the backup data set identifies the second pool.

17. The system of claim 16, wherein the operating system is further configured to auto-detect a media pool of the set of media, and wherein the operating system is further configured to assign a unique encryption key per medium of the set of media.

18. The system of claim 16, wherein the operating system is further configured to examine a volume header of a medium of the set of media as the information of the backup data set.

19. The system of claim 17, wherein the operating system is further configured to examine a volume header of a medium of the set of media to determine if the media pool is supported by a backup application.

20. A computer-readable non-transitory storage medium stored with executable program instructions for execution by a processor, the computer-readable storage medium comprising:

program instructions that logically organize one or more data sets into a first pool within a storage security appliance cluster, the one or more data sets received from a backup application;

program instructions that examine information of a first data set of the one or more data sets;

program instructions that determine, in response to examining the information of the first data set, whether the backup application logically organizes the first data set into a second pool; and     program instructions that in response to determining that the backup application logically organizes the first data set into the second pool, associating the first pool with the second pool, determining an encryption key assigned to the first pool, encrypting data of the first data set with the encryption key, and storing persistently the encrypted first data set on a set of media, wherein the information of the first data set identifies the second pool.

21. The computer-readable non-transitory storage medium of claim 20, further comprising:

program instructions that auto-detect a media pool of the set of media; and program instructions that assign a unique encryption key for at least one medium of the set of media.

22. The computer-readable non-transitory storage medium of claim 20, further comprising:

program instructions that track at least one of a key table, a pool table, a tape table, a pool history, and a tape history.

\* \* \* \* \*